United States Patent
Hashizume et al.

(10) Patent No.: US 10,843,268 B2
(45) Date of Patent: Nov. 24, 2020

(54) METAL LAMINATED AND SHAPED OBJECT, ALUMINUM-BASED POWDER FOR METAL LAMINATING AND SHAPING, AND METHOD OF MANUFACTURING THE SAME

(71) Applicant: TECHNOLOGY RESEARCH ASSOCIATION FOR FUTURE ADDITIVE MANUFACTURING, Tokyo (JP)

(72) Inventors: Yoshiki Hashizume, Osaka (JP); Isao Murakami, Osaka (JP); Kenji Muramatsu, Osaka (JP); Kenta Ishigami, Osaka (JP)

(73) Assignee: TECHNOLOGY RESEARCH ASSOCIATION FOR FUTURE ADDITIVE MANUFACTURING, Tokyo (JP)

(*) Notice: Subject to any disclaimer, the term of this patent is extended or adjusted under 35 U.S.C. 154(b) by 493 days.

(21) Appl. No.: 15/545,989

(22) PCT Filed: Dec. 26, 2016

(86) PCT No.: PCT/JP2016/088773
§ 371 (c)(1),
(2) Date: Jul. 24, 2017

(87) PCT Pub. No.: WO2018/122937
PCT Pub. Date: Jul. 5, 2018

(65) Prior Publication Data
US 2018/0339343 A1 Nov. 29, 2018

(51) Int. Cl.
B22F 3/12 (2006.01)
B29C 64/153 (2017.01)

(52) U.S. Cl.
CPC ............. *B22F 3/12* (2013.01); *B29C 64/153* (2017.08)

(58) Field of Classification Search
CPC ................................ B22F 3/12; B29C 64/153
See application file for complete search history.

(56) References Cited

U.S. PATENT DOCUMENTS

2011/0091346 A1* 4/2011 Pandey ............... B22F 3/20
419/28

FOREIGN PATENT DOCUMENTS

| JP | 2004-149826 A | 5/2004 |
| JP | 2007-521389 A | 8/2007 |
| JP | 2011-21218 A | 1/2011 |
| WO | 2005/066380 A1 | 7/2005 |
| WO | 2016/185966 A1 | 11/2016 |

OTHER PUBLICATIONS

Flumerfelt ("Aluminum powder metallurgy processing, Retrospective Theses and Dissertations":, (1998)) (Year: 1998).*
Flumerfelt ("Aluminum powder metallurgy processing", Retrospective Theses and Dissertations, Jan. 1, 1988, 165 pages.) (Year: 1988)—Disclosed in IDS.*
Supplementary European Search Report (SESR) dated Mar. 27, 2019 for Application No. 16885441.2.
Flumerfelt, J. F., "Aluminum powder metallurgy processing", Retrospective Theses and Dissertations, Jan. 1, 1988, 165 pages.
Weingarten, C., et al., "Formation and reduction of hydrogen porosity during selective laser melting of AlSi10Mg", Journal of Materials Processing Technology, vol. 221, Jul. 1, 2015, pp. 112-120.
Bauer, D. M., et al., "Effect of Process Gas and Powder Quality on Aluminum Alloys Processed by Laser Based Powder Bed Melting Process", Solid Freeform Fabrication 2016, 27th Annual International Solid Freeform Fabrication Symposium 2016, Aug. 8, 2016, pp. 419-425.
International Search Report (ISR) and Written Opinion (WO) dated Mar. 29, 2017 for International Application No. PCT/JP2016/088773.
J-PlatPat English abstract of JP 2004-149826 A.
J-PlatPat English abstract of JP 2011-21218 A.

* cited by examiner

*Primary Examiner* — Anthony J Zimmer
*Assistant Examiner* — Ricardo D Morales
(74) *Attorney, Agent, or Firm* — Ladas & Parry LLP

(57) ABSTRACT

The present invention provides a robust metal lamination-shaped object containing aluminum and having no defect. A metal powder used for forming this metal lamination-shaped object is an aluminum-based powder having a volume-based 50% particle diameter larger than or equal to 10 μm and smaller than 100 μm when a particle diameter distribution is measured by a laser diffraction-scattering method, a specific surface area smaller than or equal to 0.5 m²/g, and an oxygen amount larger than or equal to 3 mg/m² and less than or equal to 10 mg/m² per unit surface area. A relationship between a hydrogen amount (X ml in standard state) per 100 g of the aluminum-based powder and a specific surface area (Y m²/g), and a relationship between the hydrogen amount (X ml in standard state) and an oxygen amount (Z wt %), are respectively in accordance with formulas: X/Y<151 and Z/X>0.0022. A metal lamination-shaped object, that is lamination-shaped by a three-dimensional lamination-shaping apparatus in a powder bed fusion type using the above metal powder, has a hydrogen amount less than or equal to 3 ml in standard state per 100 g, and a relative density more than or equal to 99%.

10 Claims, No Drawings

METAL LAMINATED AND SHAPED OBJECT, ALUMINUM-BASED POWDER FOR METAL LAMINATING AND SHAPING, AND METHOD OF MANUFACTURING THE SAME

RELATED APPLICATION

This application is an application under 35 U.S.C. 371 of International Application No. PCT/JP2016/088773 filed on Dec. 26, 2016, the entire contents of which are incorporated herein by reference.

TECHNICAL FIELD

The present invention relates to metal lamination-shaping.

BACKGROUND ART

In the abovementioned technical field, patent literature 1 has disclosed a method of adding a sintering aid to an aluminum powder as needed, and sintering the aluminum powder by heating it in a nitrogen atmosphere containing water vapor at a predetermined partial pressure. Patent literature 1 describes that a sintered object having a high relative density is obtained by using a metal lamination-shaping technique in this method. Also, patent literature 2 has disclosed a method of removing defects by densifying a shaped object by hot isostatic pressing.

CITATION LIST

Patent Literature

Patent literature 1: Japanese PCT National Publication No. 2007-521389 (International Publication WO2005/066380)

Patent literature 2: Japanese Patent Laid-Open No. 2004-149826

SUMMARY OF THE INVENTION

Technical Problem

Unfortunately, it is difficult for the technique described in abovementioned cited literature 1 to completely remove defects, and there is also a problem that the relative density of a sintered object largely decreases even when the vapor partial pressure has slightly changed. In addition, the method described in abovementioned cited reference 2 is very difficult to put to practical use because the process is complicated and the cost is high.

The present invention enables to provide a technique of solving the above problems.

Solution to Problem

One aspect of the present invention provides a metal powder used for lamination-shaping which is an aluminum-based powder having a volume-based 50% particle diameter larger than or equal to 10 μm and smaller than 100 μm when a particle diameter distribution is measured by a laser diffraction-scattering method, a specific surface area smaller than or equal to 0.5 m²/g, and an oxygen amount larger than or equal to 3 mg/m² and less than or equal to 10 mg/m² per unit surface area, wherein a relationship between a hydrogen amount (X ml in standard state) per 100 g of the aluminum-based powder and a specific surface area (Y m²/g), and a relationship between the hydrogen amount (X ml in standard state) and an oxygen amount (Z wt %), are respectively in accordance with following formulas:

$X/Y < 151$ and, $Z/X > 0.0022$ preferably, $X/Y \leq 130$ and, $Z/X \geq 0.003$.

Another aspect of the present invention provides a method of manufacturing a metal powder used for lamination-shaping, the method comprising:

manufacturing an aluminum-based alloy powder by gas atomization process or centrifugal atomization process in an inert gas atmosphere in which an oxygen amount is controlled; and deaerating the aluminum-based alloy powder in an inert gas at 300° C. to 600° C.

Still another aspect of the present invention provides a metal lamination-shaped object that is lamination-shaped by a three-dimensional lamination-shaping apparatus in a powder bed fusion type using the metal powder as mentioned above, wherein a hydrogen amount is less than or equal to 3 ml per 100 g in standard state, and a relative density is more than or equal to 99%, in the metal lamination-shaped object.

Advantageous Effects of Invention

According to the present invention, a robust metal lamination-shaped object containing aluminum and having no defect can be obtained.

DESCRIPTION OF EXAMPLE EMBODIMENTS

Example embodiments of the present invention will now be described in detail with reference to the drawings. It should be noted that constituent elements described in the following example embodiments are merely examples, and do not intend to limit the technical scope of the present invention to them. Note also that in this specification, "a standard state" is a state at 0° C. and 1 atm.

<Technical Premise>

In casting or powder metallurgy using an aluminum-based material, it is known that hydrogen contained in the aluminum-based material causes a defect. When manufacturing an aluminum alloy by casting or powder metallurgy, therefore, a method of removing solute hydrogen or surface hydrogen (water or the like) by performing degassing during the process is generally performed. However, a degassing step like this is very difficult to perform when using an aluminum-based material in metal lamination-shaping. Even if the degassing step can be performed, degassing requires a very long time and significantly decreases the productivity.

(Problems)

A subject of this example embodiment is to examine a defect generating mechanism in metal lamination-shaping using an aluminum-based powder, and control the amounts of hydrogen and oxygen per unit surface area contained in the powder, thereby obtaining a defect-free shaped object without any degassing step.

Another subject of this example embodiment is to solve the problem that an aluminum-based powder absorbs moisture with time and the density of a lamination-shaped object decreases. For example, this example embodiment solves the problem that when collecting and reusing a used powder after lamination-shaping, the powder absorbs moisture, so the initial shaped object density cannot be obtained.

<Aluminum-Based Alloy Powder>

A method of obtaining an aluminum-based alloy powder of this example embodiment has the following two steps.

(1) An aluminum-based alloy powder is manufactured by gas atomization process, more preferably, centrifugal atomization process in an inert gas atmosphere in which the oxygen amount is controlled.

(2) Then, the manufactured aluminum-based alloy powder is deaerated in an inert gas at 300° C. to 600° C. and more preferably 400° C. to 500° C., thereby obtaining an aluminum-based alloy powder of this example embodiment.

(1: Manufacture of Aluminum-Based Alloy Powder)

An aluminum-based alloy powder to be used in this example embodiment is an Al—Si—Mg-based alloy. In particular, Si=10 wt % and Mg=0.4 wt % are added to an Al ground metal having a purity of 99.7 wt %, and heated Al-10 wt % Si-0.4 wt % Mg is used as an alloy molten metal. Note that the alloy composition of the aluminum-based alloy powder is not limited to the Al—Si—Mg-based alloy, and it is possible to preferably use a wrought alloy (A1000 series, A2000 series, A3000 series, A4000 series, A5000 series, A6000 series, A7000 series, or A8000 series), a casting alloy, or a diecast alloy.

(Use of Gas Atomization Process)

A 900° C. molten metal of the obtained Al-10 wt % St-0.4 wt % Mg alloy is sprayed from a nozzle having a diameter of 2.2 mm, and atomized with 2.5-MPa high-pressure nitrogen. Atomized particles cooled in atmosphere are collected by a cyclone and bag filter. In addition, the atomized particles cooled in nitrogen adjusted to have an oxygen amount of 1 ppm or less are collected by the cyclone and bag filter. The atomization conditions and atomization atmosphere are that the atomization pressure was 2.0 to 5.0 MPa, and the atomization atmosphere was nitrogen, argon, or helium.

Of the atomized particles collected by the cyclone, alloy particles having a 50% particle size of 21 µm are further classified by a centrifugal force classifier, thereby removing most particles having a particle size of 7 µm or less. Then, particles obtained through a sieve having an opening of 45 µm (325 meshes) are evenly mixed by using a blender, thereby obtaining an Al-10 wt % Si-0.4 wt % Mg alloy powder of this example embodiment. Note that as this Al-10 wt % Si-0.4 wt % Mg alloy powder, it is also possible to use a powder obtained by collecting particles remaining on the sieve having an opening of 45 µm (325 meshes). That is, the 50% particle size is desirably 10 µm (inclusive) to 100 µm (exclusive).

(Use of Centrifugal Atomization Process)

A 1,100° C. molten metal of the obtained Al-10 wt % Si-0.4 wt % Mg alloy is sprayed from a nozzle having a diameter of 1.7 mm onto a graphite rotary disk having a diameter of 100 mm and rotating at 20,000 rpm, which is installed in a nitrogen chamber having a diameter of 4 m and adjusted to have 0.01 wt % of oxygen, thereby obtaining aluminum-based particles. The distance between the spray nozzle and the rotary disk is 15 mm. The obtained aluminum-based particles are collected and further classified by the centrifugal force classifier, thereby removing most particles having a diameter of 7 µm or less. Then, particles obtained through a sieve having an opening of 45 µm (325 meshes) are evenly mixed by using a blender, thereby obtaining an Al-10 wt % Si-0.4 wt % Mg alloy powder of this example embodiment.

(2: Deaeration of Aluminum-Based Alloy Powder)

The obtained aluminum-based alloy powder is deaerated in an argon atmosphere as an inert gas at 300° to 600° C. and more preferably 400° C. to 500° C. The heating time is about 10 hours. Note that nitrogen or helium can also be used as the inert gas. Note also that the heating time need only be 1 to 100 hours.

<Metal Lamination-Shaped Object>

The aluminum-based alloy powder of this example embodiment manufactured by gas atomization process or centrifugal atomization process and deaerated in the inert gas atmosphere is used as a metal material for lamination-shaping, thereby shaping a metal lamination-shaped object by a three-dimensional lamination-shaping apparatus in a powder bed fusion type.

Note that an example using EOS EOSINT M280 including a 400-W output class Yb fiber laser (beam spot diameter=0.1 mm) as the three-dimensional lamination-shaping apparatus will be described below, but the feature of the metal lamination-shaped object of this example embodiment is not limited by the lamination-shaping method.

<Evaluation Methods>

The aluminum-based alloy powder and its lamination-shaped object were evaluated as follows.

(1) Particle Diameter Distribution Measurement

The powder of each example or each comparative example was dispersed for 180 sec by an ultrasonic wave, and the dispersion was placed in measurement-system circulating water and measured by using a laser refraction type diffraction particle diameter measurement apparatus (NIKKISO Microtrac MT-3300).

(2) Measurement of Specific Surface Area

The specific surface area was measured by the BET method (MOUNTECH Macsorb HM model-1210).

(3) Measurement of Oxygen Amount

The oxygen amount was measured by the inert gas melting-nondispersive infrared absorption method (HORIBA EMGA-920).

(4) Measurement of Hydrogen Amount

Hydrogen amount of powder: measured by the Ransley method.

Hydrogen amount of lamination-shaped object: measured by LECO JAPAN model RHEN602.

(3) Calculation of Ratio of Particles Having Satellites

A scanning electron microscope (JEOL JSM-6510A) was used to fix the powder of each example or each comparative example on a sample table without overlapping particles, and images enlarged by 500 times were electronically photographed in a plurality of fields. After that, at least 100 particles of the same sample were observed, and particles having satellites and particles having no satellites were counted.

The fields were photographed such that the number of particles contained in one field was 15 or less. The field size was set such that the longitudinal and lateral sides were 4 to 12 times the 50% particle diameter. The overlapping of particles was minimized, and random extraction was performed, i.e., all vague particles such as apparently fused particles were counted as satellites.

(4) Roundness

Roundness $\psi_c$ of each of 100 or more particles was measured by image analysis software (KEYENCE VHX- 1000) in a plurality of fields photographed in the same manner as in item (3) above, thereby evaluating the average roundness.

(5) Calculation and Evaluation of Abundance of Particles Smaller Than 5 μm

The Heywood diameter (an equivalent circle diameter) of each of 100 or more particles was calculated by the image analysis software (KEYENCE VHX-1000) in a plurality of fields photographed in the same manner as in item (3) above, and the number of particles smaller than 5 μm, the number of particles equal to or larger than 5 μm and smaller than 10 μm, and the number of particles equal to or larger than 10 μm were obtained. The abundance of the particles smaller than 5 μm was calculated by the following equation. If this abundance is 1.0 or less, the fluidity is high.

Evaluation of Fluidity:

(The number of particles having diameters smaller than 5 μm×3)/(the number of particles having diameters of 10 μm or more)

(6) Measurement of Alloy Composition

A powder of each example or each comparative example thermally dissolved in a pressure vessel was measured by radio-frequency inductively coupled plasma-atomic emission spectroscopy (Thermo Fisher Scientific iCAP 6500 DUOView).

(7) Characteristics of Shaped Object

Shaping was performed by EOS EOSINT M280 including a 400-W output class Yb fiber laser (beam spot diameter=0.1 mm).

A column having a diameter of 8 mm×a height of 15 mm was shaped, and the relative density with respect to the true density was measured by the Archimedes method.

Also, a column having a diameter of 6 mm×a length of 38 mm was shaped, and turned into a dumbbell shape having a parallel portion diameter of 3.5 mm and a parallel portion length of 18 mm. Then, a tensile test was conducted by using a universal tester (INSTRON M4206). The crosshead speed was set at 1 mm/min.

<Evaluation Results>

(Metal Powder Used for Lamination-Shaping)

A metal powder used for lamination-shaping of this example embodiment is an aluminum-based powder having a volume-based 50% particle diameter of 10 μm (inclusive) to 100 μm (exclusive) when the particle diameter distribution is measured by the laser diffraction-scattering method, a specific surface area of 0.5 m$^2$/g or less, and an oxygen amount of 3 mg/m$^2$ (inclusive) to 10 mg/m$^2$ (inclusive) per unit surface area.

Also, in the metal powder used for lamination-shaping of this example embodiment, the relationship between the hydrogen amount (X ml in standard state) per 100 g of the aluminum-based powder and the specific surface area (Y m$^2$/g), and the relationship between the hydrogen amount (X ml in standard state) and the oxygen amount (Z wt %), are respectively in accordance with formulas:

$X/Y<151$ and $Z/X>0.0022$, particularly, $X/Y130$ and $Z/X0.003$.

(Metal Lamination-Shaped Object)

A metal lamination-shaped object of this example embodiment shaped by a three-dimensional lamination-shaping apparatus in a powder bed fusion type using the above-mentioned metal powder has a hydrogen amount of 3 ml or less (in standard state) per 100 g, and a relative density of 99% or more.

Effects of This Example Embodiment

The metal powder obtained by the aluminum-based powder of this example embodiment achieves prominent effects as follows.

(1) A defect-free robust metal lamination-shaped object which is difficult to manufacture by the conventional aluminum-based alloy powder is obtained.
(2) The fluidity and spreadability which cannot be obtained by a well-known aluminum-based alloy powder are achieved. In the lamination-shaping step, therefore, a uniform powder bed is formed, and a dense shaped object is obtained.
(3) The conventional aluminum-based powder has the problem that the oxygen amount and/or the hydrogen amount increases, and the density of the lamination-shaped object decreases. However, the metal powder used for lamination-shaping of this example embodiment is stable, and a high-density lamination-shaped object is obtained even when collecting and reusing the powder.

EXAMPLES

Table 1 shows the manufacture of aluminum-based alloy powders of Examples 1 to 6 according to the present invention and Comparative Examples 1 to 6, lamination-shaped objects using the aluminum-based alloy powders, and the test results of the powders and objects.

TABLE 1

Characteristics of Aluminum-Based Alloy Powders and Characteristics of 3D Lamination-shaped Objects using Powders

| | Composition of aluminum alloy | Powder D50 [μm] | Powder specific surface area Y [m$^2$/g] | Powder hydrogen amount X [cc/100 g Al] | Powder oxygen amount Z [%] | X/Y | Z/X | Oxygen amount per unit area (mg/m$^2$) | SEM image analysis results ① ② ③ | Shaped object hydrogen amount [cc/100 g Al] | Shaped object relative density (%) | Shaped object tensile strength [Mpa] |
|---|---|---|---|---|---|---|---|---|---|---|---|---|
| Example 1 | Al—10%Si—0.4%Mg, deaerated at 450° C. | 22.1 | 0.24 | 23.8 | 0.21 | 99 | 0.0088 | 8.8 | ○ ○ | 0.82 | 2.04 | 99.7 | 316 |
| Example 2 | Al—10%Si—0.4%Mg, deaerated at 400° C. | 51.5 | 0.18 | 20.5 | 0.16 | 114 | 0.0078 | 8.9 | ○ ○ | 0.82 | 1.90 | 99.5 | 310 |
| Example 3 | Al—10%So—0.43%Mg, deaerated at 425° C. | 22.1 | 0.24 | 27.7 | 0.21 | 115 | 0.0076 | 8.8 | ○ ○ | 0.82 | 2.78 | 99.2 | 305 |
| Example 4 | Al—10%Si—0.43%Mg, centrifugal atomization process | 28.1 | 0.17 | 16.7 | 0.06 | 98 | 0.0036 | 3.5 | ○ ○ | 0.93 | 1.78 | 99.7 | 320 |

TABLE 1-continued

Characteristics of Aluminum-Based Alloy Powders and Characteristics of 3D Lamination-shaped Objects using Powders

| | Composition of aluminum alloy | Powder D50 [μm] | Powder specific surface area Y [m²/g] | Powder hydrogen amount X [cc/100 g Al] | Powder oxygen amount Z [%] | X/Y | Z/X | Oxygen amount per unit area (mg/m²) | SEM image analysis results ① | ② | ③ | Shaped object hydrogen amount [cc/100 g Al] | Shaped object relative density (%) | Shaped object tensile strength [Mpa] |
|---|---|---|---|---|---|---|---|---|---|---|---|---|---|---|
| Example 5 | Al—10%Si—0.43%Mg, centrifugal atomization process, deaerated at 400° C. | 28.1 | 0.17 | 10.6 | 0.09 | 62 | 0.0085 | 5.3 | ○ | ○ | 0.93 | 1.23 | 99.9 | 326 |
| Example 6 | Al—10%Si—0.4%Mg, closed circuit, deaerated at 450° C. | 19.3 | 0.36 | 18.3 | 0.19 | 51 | 0.0104 | 5.3 | X | X | 0.89 | 1.93 | 99.1 | 303 |
| Comparative Example 1 | Al—10%Si—0.43%Mg | 22.1 | 0.24 | 51.4 | 0.18 | 214 | 0.0035 | 7.5 | ○ | ○ | 0.82 | 4.82 | 90.1 | 290 |
| Comparative Example 2 | Al—10%Si—0.4%Mg | 51.5 | 0.18 | 40.4 | 0.18 | 224 | 0.0045 | 10.0 | ○ | ○ | 0.82 | 3.74 | 93.3 | 293 |
| Comparative Example 3 | Commercially available Al—10%Si—0.4%Mg | 29.0 | 0.24 | 26.7 | 0.06 | 111 | 0.0022 | 2.5 | X | X | 0.90 | 1.70 | 98.6 | 297 |
| Comparative Example 4 | Commercially available Al—10%Si—0.4%Mg | 45.5 | 0.19 | 28.7 | 0.16 | 151 | 0.0056 | 8.4 | ○ | ○ | 0.68 | 3.00 | 92.5 | 280 |
| Comparative Example 5 | Al—10%Si—0.4%Mg, closed circuit and not deaerated | 19.1 | 0.34 | 60.5 | 0.17 | 178 | 0.0028 | 5.0 | X | X | 0.88 | 4.11 | 98.3 | 285 |
| Comparative Example 6 | Al—10%Si—0.4%Mg, deaerated at 400° C. in air | 22.3 | 0.22 | 28.5 | 0.33 | 130 | 0.0116 | 15.0 | ○ | ○ | 0.83 | 2.1 | 93.5 | 275 |

SEM image analysis results
① ○: when the number of particles having diameters of 5 μm or less × 3 ≤ the number of particles having diameters of 10 μm or more,
X: in other cases
② ○: when the number of particles having satellites ≤ the number of particles having no satellites,
X: in other cases
③ Average roundness <Aluminum-Based Alloy Powders of Examples 1 to 6 and Lamination-Shaped Objects Thereof>

The manufacture of aluminum-based alloy powders of Examples 1 to 6, lamination-shaped objects using the powders, and the test results of the powders and objects will be explained below.

Example 1

Si=10 wt % and Mg=0.4 wt % were added to an Al ground metal having a purity of 99.7 wt %, and an Al-10 wt % Si-0.4 wt % Mg alloy molten metal was formed by heating the obtained material. The obtained 900° C. molten metal was sprayed from a nozzle having a diameter of 2.2 mm, and atomized by 2.5-MPa high-pressure nitrogen. Atomized particles cooled in atmosphere were collected by a cyclone and bag filter. Of the atomized particles collected by the cyclone, alloy particles having a 50% particle diameter of 21 μm were further classified by a centrifugal force classifier, thereby removing most particles equal to or smaller than 7 μm. Then, particles obtained through a sieve having an opening of 45 μm (325 meshes) were evenly mixed by using a blender, thereby, obtaining an Al-10 wt % Si-0.4 wt % Mg alloy powder of this example. Furthermore, the obtained alloy powder was heated in an argon atmosphere at 450° C. for 10 hours.

Table 1 shows the characteristic values of this powder and the relative density and tensile strength of a lamination-shaped object manufactured by using the powder.

Example 2

A powder of Example 2 was obtained following the same procedures as in Example 1, except that a powder obtained by collecting particles remaining on the sieve having an opening of 45 μm was used, and the heating temperature in the argon atmosphere was set at 400° C.

Table 1 shows the characteristic values of this powder and the relative density and tensile strength of a lamination-shaped object manufactured by using the powder.

Example 3

A powder of Example 3 was obtained following the same procedures as in Example 1, except that the heating temperature in the argon atmosphere was set at 425° C.

Table 1 shows the characteristic values of this powder and the relative density and tensile strength of a lamination-shaped object manufactured by using the powder.

Example 4

Si=10 wt % and Mg=0.4 wt % were added to an Al ground metal having a purity of 99.7 wt %, and an Al-10 wt % Si-0.4 wt % Mg alloy molten metal was formed by heating the obtained material. The obtained 1,100° C. molten metal was sprayed from a nozzle having a diameter of 1.7 mm onto a graphite rotary disk having a diameter of 100 mm and rotating at 20,000 rpm, which was installed in a nitrogen chamber having a diameter of 4 m and adjusted to have 0.01 wt % of oxygen, thereby obtaining aluminum-based particles. The distance between the spray nozzle and the rotary disk was 15 mm. The obtained aluminum-based particles were collected and further classified by the centrifugal force classifier, thereby removing most particles equal to or smaller than 7 μm. Then, particles obtained through a sieve having an opening of 45 μm (325 meshes) were evenly mixed by using a blender, thereby obtaining an Al-10 wt % Si-0.4 wt % Mg alloy powder of this example.

Table 1 shows the characteristic values of this powder and the relative density and tensile strength of a lamination-shaped object manufactured by using the powder.

Example 5

The aluminum-based powder obtained in Example 4 was heated in a 450° C. argon atmosphere for 10 hours.

Table 1 shows the characteristic values of this powder and the relative density and tensile strength of a lamination-shaped object manufactured by using the powder.

Example 6

Si=10 wt % and Mg=0.4 wt % were added to an Al ground metal having a purity of 99.7 wt %, and an Al-10 wt % Si-0.4 wt % Mg alloy molten metal was formed by heating the obtained material. The obtained 900° C. molten metal was sprayed from a nozzle having a diameter of 2.2 mm, and atomized by 2.5-MPa high-pressure nitrogen. Atomized particles cooled in nitrogen adjusted to have an oxygen amount of 1 ppm or less were collected by the cyclone and bag filter. Of the atomized particles collected by the cyclone, alloy particles having a 50% particle diameter of 21 μm were further classified by the centrifugal force classifier, thereby removing most particles equal to or smaller than 7 μm. Then, particles obtained through a sieve having an opening of 45 μm (325 meshes) were evenly mixed by using a blender, thereby obtaining an Al-10 wt % Si-0.4 wt % Mg alloy powder of this example. Furthermore, the obtained alloy powder was heated in an argon atmosphere at 450° C. for 10 hours.

Table 1 shows the characteristic values of this powder and the relative density and tensile strength of a lamination-shaped object manufactured by using the powder.

<Aluminum-Based Alloy Powders of Comparative Examples 1 to 6 and Lamination-Shaped Objects Thereof>

For comparison with the manufacture of the aluminum-based alloy powders of Examples 1 to 6 and the lamination-shaped objects using the powders, aluminum-based alloy powders of Comparative Examples 1 to 6, lamination-shaped objects using the powders, and the test results of the powders and objects will be explained below.

Comparative Example 1

An aluminum-based powder of Comparative Example 1 was obtained following the same procedures as in Example 1, except that no heating process in an argon atmosphere was performed.

Table 1 shows the characteristic values of this powder and the relative density and tensile strength of a lamination-shaped object manufactured by using the powder.

Comparative Example 2

An aluminum-based powder of Comparative Example 2 was obtained following the same procedures as in Example 2, except that no heating process in an argon atmosphere was performed.

Table 1 shows the characteristic values of this powder and the relative density and tensile strength of a lamination-shaped object manufactured by using the powder.

Comparative Example 3

Table 1 shows the characteristic values of a commercially available, relatively fine aluminum-based powder for metal lamination-shaping, and the relative density and tensile strength of a lamination-shaped object manufactured by using the powder.

Comparative Example 4

Table 1 shows the characteristic values of a commercially available, relatively coarse aluminum-based powder for metal lamination-shaping, and the relative density and tensile strength of a lamination-shaped object manufactured by using the powder.

Comparative Example 5

An aluminum-based powder of Comparative Example 5 was obtained following the same procedures as in Example 6, except that no heating process in an argon atmosphere was performed.

Table 1 shows the characteristic values of this powder and the relative density and tensile strength of a lamination-shaped object manufactured by using the powder.

Comparative Example 6

An aluminum-based powder of Comparative Example 6 was obtained following the same procedures as in Example 1, except that a deaeration process was performed in air at 400° C.

Table 1 shows the characteristic values of this powder and the relative density and tensile strength of a lamination-shaped object manufactured by using the powder.

<Verification of Stability and Reuse>

The aluminum-based alloy powders of Examples 1 to 5 and Comparative Examples 1 to 6 described above were stored in an open state at room temperature for one month, and repetitively lamination-shaped five times. After that, the hydrogen amounts and oxygen amounts of the collected powders were measured. Table 2 shows the obtained results.

TABLE 2

Changes in Hydrogen Amounts and Oxygen Amounts of Aluminum Alloy Powders and Lamination-shaped Object Densities

| | Aluminum alloy composition | Immediately after manufacture (unsealing) | | | After storage at room temperature for 1 month | | | Collected after lamination-shaping (5 times) | | |
|---|---|---|---|---|---|---|---|---|---|---|
| | | Powder hydrogen amount [cc/100 gAl] | Powder oxygen amount [%] | Shaped object relative density (%) | [cc/100 gAl] | [%] | (%) | (cc/100 gAl) | [%] | (%) |
| Example 1 | Al—10%Si—0.4%Mg, deaerated at 450° C. | 23.8 | 0.21 | 99.7 | 24.1 | 0.22 | 99.6 | 23.9 | 0.21 | 99.6 |
| Example 2 | Al—10%Si—0.4%Mg, deaerated at 400° C. | 20.5 | 0.16 | 99.5 | 22.3 | 0.17 | 99.4 | 21.2 | 0.16 | 99.5 |
| Example 3 | Al—10%Si—0.43%Mg, deaerated at 425° C. | 27.7 | 0.21 | 99.2 | 28.4 | 0.21 | 99.2 | 28.0 | 0.21 | 99.2 |
| Example 4 | Al—10%Si—0.43%Mg, centrifugal atomization process | 16.7 | 0.06 | 99.7 | 17.1 | 0.07 | 99.7 | 16.9 | 0.07 | 99.7 |
| Example 5 | Al—10%Si—0.43%Mg, centrifugal atomization process, deaerated at 400° C. | 10.6 | 0.09 | 99.9 | 10.8 | 0.09 | 99.9 | 10.7 | 0.09 | 99.9 |
| Example 6 | Al—10%Si—0.4%Mg, closed circuit, deaerated at 450° C. | 30.4 | 0.11 | 99.1 | 32.5 | 0.13 | 99.0 | 31.4 | 0.12 | 99.1 |
| Comparative Example 1 | Al—10%Si—0.43%Mg | 51.4 | 0.18 | 90.1 | 60.6 | 0.22 | 89.9 | 58.8 | 0.20 | 89.9 |
| Comparative Example 2 | Al—10%Si—0.4%Mg | 40.4 | 0.18 | 93.3 | 47.3 | 0.20 | 92.5 | 45.2 | 0.19 | 92.8 |
| Comparative Example 3 | Commercially available Al—10%Si—0.4%Mg | 26.7 | 0.06 | 98.6 | 51.8 | 0.41 | 92.2 | 36.9 | 0.35 | 92.7 |
| Comparative Example 4 | Commercially available Al—10%Si—0.4%Mg | 28.7 | 0.16 | 92.5 | 32.8 | 0.20 | 90.6 | 31.6 | 0.22 | 91.1 |
| Comparative Example 5 | Al—10%Si—0.4%Mg, closed circuit and not deaerated | 60.5 | 0.17 | 98.3 | 77.7 | 0.45 | 91.5 | 87.4 | 0.37 | 92.3 |
| Comparative Example 6 | Al—10%Si—0.4%Mg, deaerated in air at 400° C. | 28.5 | 0.33 | 93.5 | 29.4 | 0.34 | 93.3 | 29.1 | 0.33 | 93.4 |

Aging Stability Test

Stored at room temperature for 1 month: average temperature=25° C., average relative humidity=60%

Collected after lamination-shaping: lamination-shaping→collection→pulverization→sieving were repeated 5 times Table 2 shows that the aluminum-based powders of the examples did not largely change the hydrogen amounts and oxygen amounts even after being stored in an open state, and the density of each lamination-shaped object did not decrease even after being aged, collected, and lamination-shaped again. In the comparative examples, however, the density of the lamination-shaped object manufactured from the powder having a Z/X value of less than 0.0022, particularly, less than 0.003 significantly decreased.

The invention claimed is:

1. A metal powder used for lamination-shaping which is an aluminum-based powder having a volume-based 50% particle diameter larger than or equal to 10 μm and smaller than 100 μm when a particle diameter distribution is measured by a laser diffraction-scattering method, a specific surface area smaller than or equal to 0.5 m²/g, and an oxygen amount larger than or equal to 3.0 mg/m² and less than or equal to 10.0 mg/m² per unit surface area,
wherein a relationship between a hydrogen amount (X ml in standard state) per 100 g of the aluminum-based powder and a specific surface area (Y m²/g), and a relationship between the hydrogen amount (X ml in standard state) and an oxygen amount (Z wt %), are respectively in accordance with following formulas:

$X/Y < 151$ and, $Z/X > 0.0022$.

2. The metal powder according to claim 1, wherein the relationship between the hydrogen amount (X ml in standard state) and the specific surface area (Y m²/g), and the relationship between the hydrogen amount (X ml in standard state) and the oxygen amount (Z wt %), are respectively in accordance with following formulas:

$X/Y \leq 130$ and, $Z/X \geq 0.003$.

3. A method of manufacturing the metal powder of claim 1 used for lamination-shaping, the method comprising:
manufacturing an aluminum-based alloy powder by gas atomization process or centrifugal atomization process in an inert gas atmosphere in which an oxygen amount is controlled; and
deaerating the aluminum-based alloy powder in an inert gas at 300° C. to 600° C.

4. The method according to claim 3, wherein, in said deaerating step, the aluminum-based alloy powder is deaerated in an inert gas at 400° C. to 500° C.

5. The method according to claim 3, wherein, in said deaerating step, the aluminum-based alloy powder is deaerated in an inert gas for 1 to 100 hours.

6. A metal lamination-shaped object that is lamination-shaped by a three-dimensional lamination-shaping apparatus in a powder bed fusion type using the metal powder according to claim 1,
wherein a hydrogen amount is less than or equal to 3 ml per 100 g in standard state, and a relative density is more than or equal to 99%, in the metal lamination-shaped object.

7. A metal lamination-shaped object that is lamination-shaped by a three-dimensional lamination-shaping apparatus in a powder bed fusion type using the metal powder according to claim 2,
wherein a hydrogen amount is less than or equal to 3 ml per 100 g in standard state, and a relative density is more than or equal to 99%, in the metal lamination-shaped object.

8. The method according to claim 4, wherein, in said deaerating step, the aluminum-based alloy powder is deaerated in an inert gas for 1 to 100 hours.

9. The method according to claim 5, where the deaerating step is performed for 10 hours.

10. The method according to claim 8, where the deaerating step is performed for 10 hours.

* * * * *